United States Patent [19]
Paulsson et al.
[11] Patent Number: 4,634,809
[45] Date of Patent: Jan. 6, 1987

[54] TERMINAL SYSTEMS

[76] Inventors: Kurt Paulsson, Filipstadsbacken 50, 123 43 Farsta; Trok, Beniamin, Bivägen 5, 136 75 Handen, both of Sweden

[21] Appl. No.: 675,304
[22] Filed: Nov. 27, 1984
[30] Foreign Application Priority Data
Nov. 28, 1983 [SE] Sweden ............ 8306547
[51] Int. Cl.⁴ ............ H04M 1/57
[52] U.S. Cl. ............ 379/91; 379/95; 379/96; 379/103; 379/210
[58] Field of Search ............ 179/2 A, 18 B, 6.17, 179/6.02, 6.11, 2 DP, 27 FH, 84 C

[56] References Cited

U.S. PATENT DOCUMENTS 4,371,752 2/1983 Matthews et al. ............ 179/18 B X
4,476,349 10/1984 Cottrell et al. ............ 179/18 B

*Primary Examiner*—James L. Dwyer
*Attorney, Agent, or Firm*—Burns, Doane, Swecker & Mathis

[57] ABSTRACT

A terminal system includes first and second terminals (7, 8 and 3*a* respectively). The terminals can be connected to a central equipment and the first terminals are used for a first functional mode, for example passage control, where persons allotted identification cards can insert information into the common central equipment. The first and second terminals and the central equipment are arranged for a second functional mode, which operates in parallel with the first functional mode. The messages are inserted into the central equipment via the second terminals. Respective first terminals are provided with indicators (6*b*, 6″, 7*a*, 8*b*) which can be activated when information relating to a particular person is stored in the central equipment and this particular person, in order to carry out a procedure in the first functional mode, simultaneously activates the first terminal with the aid of his/her identification cards. The indicators provide indication that the message is available for collection in the central equipment with respect to the person concerned. In an alternative embodiment, the information can be reproduced directly at the first terminal, either by audio or visual reproduction.

22 Claims, 13 Drawing Figures

TERMINAL SYSTEMS

TECHNICAL FIELD

The present invention relates to an arrangement in terminal systems comprising first and second terminals which are connected to, or capable of being connected to central equipment common thereto. The first terminals and central equipment common thereto are allotted a first functional mode, in which persons utilizing this mode are issued identification means providing access to means for delivering information and/or collecting information, by activating a first actuating means in said first terminals.

BACKGROUND ART

Such terminal systems having associated central equipment common thereto are known to the art. Examples of such known systems include data processing systems for time-recording, wage-data recording, and passage-control purposes. By passage-control is meant here, and in the following, knowledge of the whereabouts of a person in relation to given control areas, for example on the premises of a company or establishment.

In the case of time-recording systems, for example, those persons using the systems, or associated therewith, are issued identification means by which they announce their entrance into and departure from the system. Such identification means may have the form of an identification card provided with information specific to the person concerned. When this card is inserted into an appropriate card reader, located in one of the first terminals of the systems, information concerning the passage of said person from one area to another, e.g. such information as time, reason, etc., and information relating to the card holder, is transmitted to the aforesaid central equipment in the system. This enables information relating to persons using the system to be collected, e.g. by means of data processors, and utilized in different contexts and routines within the company or establishment served by the system.

A further example of such terminal systems is the so-called interception system, into which persons within a company or establishment can introduce information relating to their presence on the premises, where they are to be found, their geographic whereabouts, their movements within the company premises, etc.. A control person, such as a telephone operator has access to this information, and on the basis thereof is able to answer queries as to the whereabouts of a particular person, the reason for his/her absence etc., when the person sought is not available in his/her normal geographical location in the company premises. It is also known to connect and integrate such interception systems to and with telephone exchanges, preferably automatic, data-carrying private branch exchanges. When an interception system is integrated with a private branch exchange or subscriber installation with extension stations, the person operating the exchange is able to continually obtain information relating to the whereabouts on the premises of a person possessing a given extension number. In this respect, the operator has access to a so-called intermediary apparatus associated with the private branch exchange, and also to an interception terminal, and in the event of an incoming call to an extension which, for some reason or other is coupled to the interception terminal, the operator receives this call and, at the same time, discloses on the interception terminal information as to why the extension number called does not answer, etc..

A further example of such terminal systems are banknote dispensers, in which upon presentation of the requisite identification and appropriate activation of a keybank on a first terminal, an ordered sum of money can be taken-out from the dispenser, together with a data-slip recording the withdrawal, or like information.

DISCLOSURE OF THE INVENTION

1. Technical Problem

There is a general desire within this art to utilize existing equipment more efficiently, coupled with an urgent need to increase the number of facilities afforded thereby. One such need is that of being placed quickly in contact with different persons on the premises of a company or an establishment, especially when the premises are large. For example, it may be included in the duties of a particular person to move from place to place within the premises, who can thus seldom be contacted at a specific location, such as his/her office. At times, the occasion may arise when it is necessary to contact a person who is about to leave the premises. Another occasion is one in which it is necessary to contact the person immediately when she/he enters her/his working location. These technical problems are at present in need of qualified technical solutions.

2. Solution

An object of the invention is to provide an arrangement of the aforesaid kind which, inter alia, solves the aforementioned problems. Accordingly, there is provided in accordance with the invention an arrangement in a terminal system of the kind described in the introduction in which one of the main characteristic features of the novel system is that the first and the second terminals and the central equipment common thereto are allotted a second functional mode which functions in parallel with the first functional mode. Another characteristic feature of the novel system is that in respect of the second functional mode one or more second terminals are arranged for the insertion, relaying, and storage in said central equipment of individual messages to the aforesaid persons and of identification associated therewith and connecting respective messages with respective persons. A third characteristic resides in that the second functional mode and first terminal are provided with a second means which can be activated when information peculiar to a particular person is stored in said central equipment common to the first and second terminals, and said person, in order to carry out a procedure in the first functional mode, activates the first means of the first terminal with the aid of his/her identification means. A fourth characteristic feature of the novel system resides in that in accordance with a first embodiment the second means is arranged, when activated, to indicate that a message concerning a particular person is present in the aforesaid central equipment. In accordance with a further embodiment, this second means is arranged, when activated, to produce an audio and/or visual signal, reproducing the message.

In accordance with a third embodiment, a combination of the aforesaid indication that a message has been received and stored and of the audio/or visual presentation of this message is provided. In this latter case, the second means may be provided with facilities which enable the person concerned to decide whether he wishes to collect the information at that moment in time.

The means and devices associated with the first and second functional modes may be dual-purpose devices. For example, the aforesaid second means for reproducing said indication and/or information may also be incorporated in the first functional mode, when desiring to collect information therein. This applies, for example, to the aforesaid banknote dispensers.

When the first functional mode incorporates a passage control system (as hereinbefore defined), third terminals are suitably connected to the first terminals. In this case, the first and the third terminals are organized in pairs. The indication signal received from said second means is therewith obtained on respective first terminals in conjunction with the use of the functional mode. The person who activates the first terminal concerned receives said indication that a message has been stored, and can then activate the nearby third terminal, for example by introducing thereto his/her personal identification means or some other identification means proving that he or she is the person to whom the message is addressed. An arrangement comprising separate first and third terminals may be applicable when desiring to avoid, for example, the formation of queues in conjunction with passage control. When no such need occurs, the first and third terminals can be integrated in pairs.

The aforesaid central equipment common to the terminals may also incorporate the passage control systems or interception equipment. Alternatively, the central equipment may incorporate both the passage control system and the interception equipment, the system and said equipment being coupled together or integrated with one another. In a further embodiment, the interception equipment is integrated in an automatic private branch exchange in which messages can be intercepted with the aid of the interception equipment in a known manner.

The second terminals in the system are served by operator situated at a passage station. The functioning mode of the private branch exchange and interception equipment is such that subscribers thereto are able to register therein information to the effect that they are to be found on the premises. This information is available to the person on duty at the passage station, and can be availed upon when answering incoming calls relating to the person whose calls are routed for interception. If the incoming caller wishes a message to be delivered to the person sought, the operator is able to introduce the message through the aforesaid second terminals. When the person sought carries out the first functional mode on a first terminal, she/he is thus informed that a message awaits collection, or receives the message in conjunction with carrying out the first functional mode.

Thus, individual messages intended for different persons, together with identification numbers connecting respective messages to respective people, are stored in the memory spaces in the interception equipment and/or the passage control system.

ADVANTAGES

The aforedescribed arrangement affords a number of important advantages. For example, messages can be delivered to a person possessing an identification means very quickly, without requiring the provision of additional systems within the premises of, for example, a company or an establishment. In addition, the administration of the second functional mode and the person operating the system associated therewith are not encumbered with the administration of the information in question.

BRIEF DESCRIPTION OF THE DRAWINGS

An embodiment, at present preferred, of an arrangement having characteristic features significant to the invention will now be described in more detail with reference to the accompanying drawings, in which.

DESCRIPTION OF A PREFERRED EMBODIMENT

Figure 1:
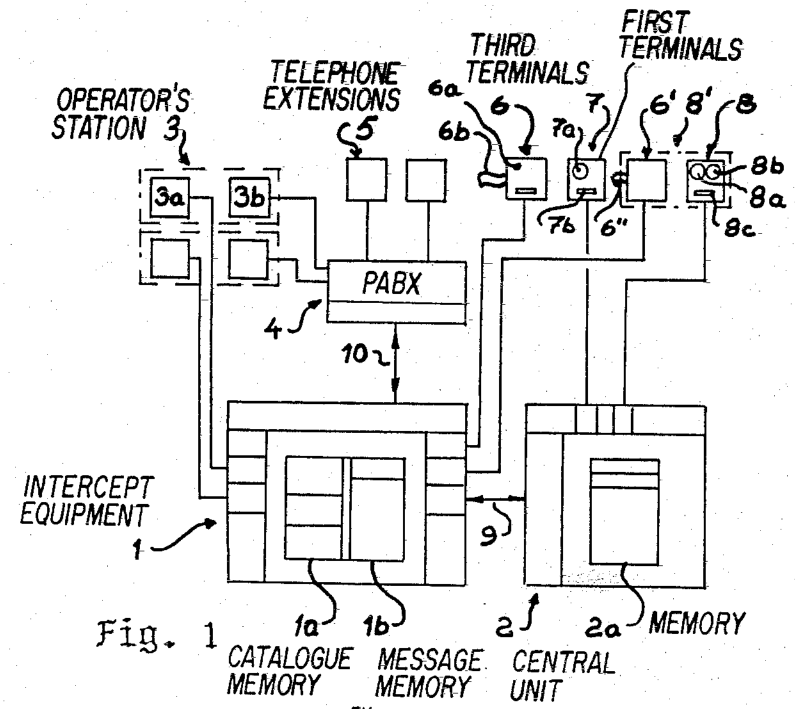
FIG. 1 is a block schematic of a terminal system having central equipment, including a passage control system and interception means, the latter being coupled to an automatic private branch exchange.

In FIG. 1 the reference 1 identifies generally symbolically illustrated known interception equipment, such as that sold by the National Swedish Telecommunications Administration under the designation SESAM. Such interception equipment may include a catalogue memory 1*a* or a number of such memories divided into blocks. The equipment also includes one or more memories 1*b*, intended for storing messages, as hereinafter described.

The reference 2 identifies a central unit of a time recording system of known design. One example of such time recording systems is the CIR-system sold by L.M. Ericssons, Stockholm, Sweden. The central unit 2 incorporates one or more memory stores 2*a*, in which information relating to the aforesaid messages can be stored.

An operator's station 3 is provided in an automatic private branch exchange 4, which is connected to the aforesaid interception equipment 1 in a known manner. One example of such public branch exchanges is that designated A345 and retailed by the Swedish National Telecommunications Administration, Stockholm, Sweden, one embodiment of which exchange is designed for an interception operating mode. The exchange also includes a number of extensions 5.

The operator's station 3 is equipped with terminals for interceptance equipment, these terminals being referred to hereinafter as second terminals 3*a*, and terminals 3*b* in the form of intermediary apparatus, hereinafter referred to as fourth terminals. Also connected to the intercept equipment are terminals, 6, 6', hereinafter referred to as third terminals.

The time recording system has associated therewith terminals 7,8, hereinafter referred to as first terminals. The first and second terminals are here assumed to be arranged in pairs. In a first embodiment, the first and third terminals are quite separate from one another; compare the terminals 6 and 7. In another embodiment, the first and third terminals are integrated in pairs in assemblies 8'; compare the terminals 6' and 8.

The first terminals 7 and 8 include first means or devices in the form of card-readers 7b and 8c of known design. This assumes the allocation of identification cards, for example cards provided with magnetic identifying strips. Other means of identification can be used, for example voice identification or image identification, wherewith the aforesaid first means or devices in the first terminals have a corresponding design. The first and third terminals are provided with second means or devices 6b, 7a, 6" and 8a which can be activated in a manner hereinafter made apparent. These second means may have the form of writers, lamps, display screens and/or loudspeakers, etc.. Third means or devices designed to issue receipts or acknowledgements may also be provided, in which case buttons, keyboards or other activating means may be required.

The interception equipment 1 and central unit 2 are connected together via a data transfer line 9, which in certain cases is bidirectional.

The equipment illustrated in FIG. 1 has the following mode of operation. An extension 5, for example an extension having extension number 1234, is connected for interception in the exchange 4. This interception connection may be effected in any known manner, for example by the person possessing the extension number himself/herself, or by the telephonist or operator etc.. The telephonist or operator may insert into the memory 1b of the interception equipment a message intended for extension 1234. This individual message is connected to the catalogue block 1a of extension 1234. This insertion of such an individual message can be effected in a known manner, e.g. can be written-in by the operator from his/her terminal 3a. When the inserted message has been stored in the interceptance equipment 1, the equipment initiates the transfer of information to this effect to the time recording system 2. This can be done with the aid of a coded message as described hereinafter. In this embodiment, the message in question is assumed to be one coded with the number fifty (50). Together with this message number there is sent to the time recording system a means of identification, for example the number of an identification card, e.g. 5678. Thus, information is stored in the memory 2a of the time recording system to the effect that the person possessing card number 5678 has a message awaiting in the interception equipment.

When the possessor of identification means 5678 activates the first terminal, by introducing his/her means of identification thereto, notification to this effect is made in the central unit 2. The time recording system then searches its memories, to check whether there is a message for the holder of said card, and sends an instruction to the activated first terminal 7 or 8, which activates a second means 7a or 8a, such as a lamp, causing the same to light-up. This provides an indication to the card holder that a message awaits him/her in the central unit of the time recording system. In the illustrated embodiment, the holder of the identification means can collect the message at the third terminal. When the first and third terminals 8' are integrated with one another, the identification holder is able to collect his/her message from the integrated third terminal, by pressing a receipt or acknowledge button 8b. The time recording system receives this acknowledgement and in response thereto transmits to the interception equipment, over the line 9, a message having the number 35 (see below). Upon receipt of message 35, the interception equipment causes the message stored in the memory 1b of the interception equipment to be written-out or printed on the printer 6". Alternatively, the message print-out can take place in conjunction with the presentation of the identification means, in which case the acknowledgement or receipt takes place automatically, in conjunction with the activation of the first terminal by the person possessing the identification means.

When the first and third terminals are separate from one another, the person possessing the identification means collects her/his message by activating the means 6a on the third terminal, whereupon the message is written-out on the writer 6b.

Visual and/or audio reproduction devices of known kind can be used instead of the writer, as an alternative means of reproducing messages.

Figure 2:
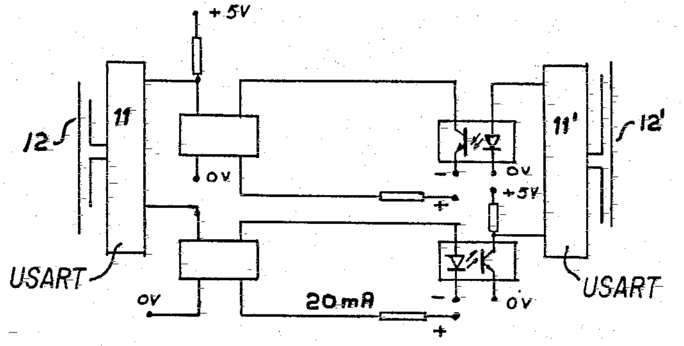
FIG. 2 illustrates the transfer arrangement between the passage control system and the interception means illustrated in FIG. 1.
Figure 3:
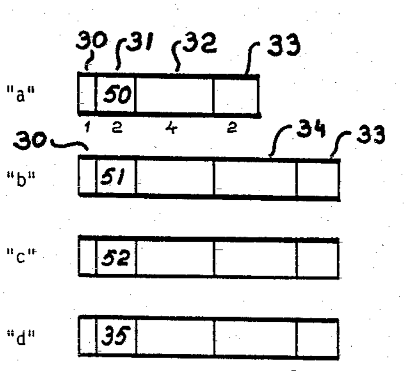
FIGS. 3*a*–3*c* illustrate different types of messages sent from the interception means to the time recording system.
Figure 4:
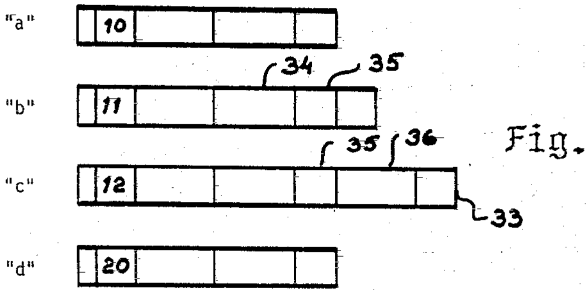
FIGS. 4*a*–4*d* illustrate other types of messages sent between the time recording system and the interception means.
Figure 5:
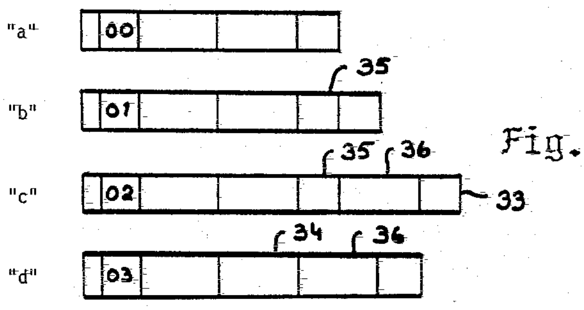
FIGS. 5*a*–5*d* illustrate a third type of message sent from the time recording system to the interception means.

FIG. 2 illustrates the transmission circuits arranged between the interception equipment 1 and the time recording system 2. In the illustrated embodiment, there is a direct connection between the interception equipment and said system. The transmission circuits may be of any known design and form a so-called TTY-interface which comprises two 20 mA current-conducting loops, one for each dispatching and receiving direction. The loops are of the kind which conduct electric current in an idle state. Since such loops are known, they will not be described in detail here. Arranged at a respective end of the loops is a so-called USART-circuit 11 and 11' respectively. The circuits are connected to a respective data-bus or highway 12,12', provided in the interception equipment and the time recording system 2. The respective data-buses are connected to a CPU having an associated program and data memory (not shown).

FIGS. 3a–5d illustrate various kinds of messages sent between the equipment 1 and the system 2. In order to illustrate the versatility of the invention, the messages chosen here by way of example have been taken from a further functional mode different to those aforedescribed. A message is composed of a number of characters. Each character comprises a start bit, seven (7) information bits, a parity bit (uniform parity) and a stop bit. The seven information bits are coded in accordance with ASCII.

In all cases the messages are prefixed with a character STX 30 (start of text). The message itself begins with a two-character code 31 which identifies the type of message being transmitted and which is followed by a four-character code 32 which identifies the number of the identification card. The message is terminated with the codes 33, representing CR and LF (carriage return and line-forward). The data located therebetween has a fixed format, determined by the type of message transmitted.

The digits on the underside of the message in FIG. 3a denote the number of characters in different parts of the message, and the written-in length corresponds to the number of characters. The same applies to the remaining messages.

The messages illustrated in FIGS. 3a–3c have been allotted different message-identification numbers, namely the message 50 in FIG. 3a, the message number 51 in FIG. 3b, the message number 52 in FIG. 3c and the message number 35 in FIG. 3d. The message 50 in FIG. 3a is sent from the interception equipment 1 to the time recording system 2, when a message is written into the memory of the interception equipment. In addition to the message-number, the message also includes a code containing four characters 32, which denote the identification code or card code to which the message refers.

The message 51 in FIG. 3*b* is a response message, in reply to a message 20. This message is sent from the interception equipment 1 to the time recording system 2 upon enquiry of the latter to the former as to whether a message awaits collection. The message 51 thus constitutes a positive response, stating that a message awaits collection. In addition, there is provided coded information 34 concerning the terminal number.

The message 52 in FIG. 3*c* corresponds to the message 51, but with the exception that it reveals that no message has been left.

The message 35 in FIG. 3*d* is an instruction to the interception equipment 1 from the time recording system 2 or one of the terminals. This message instructs the equipment 1 to send to the relevant terminal the message applicable to the identification number presented.

FIGS. 4*a*–4*d* illustrate other types of message 10,11, 12 and 20, sent from the time recording system 2 to the interception equipment 1. The message 10 is sent when a person possessing a particular identification means passes a given first terminal on his/her way into the premises of a company or establishment. The message 11 corresponds to the message 10, with the exception that this message contains coded additional information 35, disclosing the reason for passing said given first terminal. The message 12 corresponds to the message 11, but with the difference that it also contains coded information 36, disclosing the expected time of return. The message is in the form of a query, asking whether a message has been left for the person in question. The above message replies 51 and 52 are sent in answer to this query, as beforementioned.

FIGS. 5*a*–5*c* illustrate further message forms, referenced 00, 01, 02, which correspond to the above described messages 10,11 and 12, but with the difference that they are sent when a person leaves a given area of a premises, as distinct from entering said area.

The message 03 illustrated in FIG. 5*d* is a supplementary message or an alteration message, enabling the expected return time stored through message 02 to be changed.

It will be understood from the aforegoing that the described system equipment can be varied and modified widely, in order to embrace different functions and functional modes. The invention also provides the possibility of coupling from respective first terminals an intercept channel to the interception equipment. The operator is also able to receive continually information as to the whereabouts on the premises of a particular person holding a particular identification number, provided that the said person constantly reports her/his movements in the premises, through the appropriate boundary terminals.

The invention can also be applied in these cases where the aforementioned central equipment includes one or more message distribution systems, e.g. interception systems, coupled to or integrated with one or more systems of another kind, such as passage control systems, banknote dispensers, etc..

In accordance with one advantageous embodiment, one or more of said systems connected to a message distribution system has, or have, a blocking function incorporated in the system or systems and/or in the identification means concerned. Such a blocking function may be intended, for example, to permit only a given number of those persons using the system to be reached for the relaying of messages, thereby cutting system costs and design costs.

Thus, the invention is not restricted to the aforedescribed and illustrated embodiment, and modifications can be made within the scope of the following claims.

We claim:

1. An arrangement in a terminal system comprising first and second terminals connected to central equipment common thereto, in which the first terminals and the central equipment operate in a first functional mode, in which persons utilizing this mode are provided with identification means by means of which said persons can transfer information over said system by activating a first activation means in said first terminals, characterized in that the central equipment is arranged operates in a second functional mode in parallel with the first functional mode; in that cooperating with the second functional mode are at least one second terminal for the insertion, relaying, and storage in said central equipment of individual messages to said persons and of identification associated therewith and connecting respective messages with respective persons; in that respective first terminals are provided with a second means which is actuable in the second functional mode when information concerning a given person is stored in the central equipment and said person, in order to put into effect a procedure in the first functional mode, simultaneously activates through his/her identification means said first means of said first terminal; and in that said second means is arranged, when activated, to carry out at least one of the following procedures;

(a) provide indication that a message is held in the central equipment for the person concerned, (b) produce an audio and/or visual reproduction of the message.

2. An arrangement according to claim 1, characterized in that said second means are actuated to reproduce the message when said first terminals are operated in the first functional mode.

3. An arrangement according to claim 1 wherein said second means of said first terminals produce only said indication (a), and further including third terminals arranged to produce the audio and/or visual reproduction of the message in response to activation through said identification means.

4. An arrangement according to claim 1, characterized in that the central equipment includes a system for controlling passage of individuals through an area, and the first terminals are connected to said system.

5. An arrangement according to claim 1, characterized in that the central equipment includes interception equipment, and the first terminals are connected to said interception equipment.

6. An arrangement according to claim 1, characterized in that the central equipment includes interception equipment, at least one message distribution system, and at least one terminal system connected to said message distribution system, said terminal system being associated with at least one of the functions of passage control and banknote dispensing.

7. An arrangement according to claim 3, characterized in that respective first terminals are connected to a system for controlling passage of individuals in an area and the third terminals are connected to interception equipment, wherewith a person to whom the information relates and who receives said indication when introducing his/her identification at the first terminal is able to collect said message at one of said third terminals by activating the same.

8. An arrangement according to claim 7, characterized in that the first and third terminals are mutually connected in pairs.

9. An arrangement according to claim 1, characterized in that the central equipment includes interception equipment which is connected to a telephone exchange; and in that upon application of one of said identification means to a first terminal an interception notation is made by said first terminal in the interception equipment of the telephone number of the possessor of said identification, wherewith some person situated at a predetermined location in said exchange receives, via the second terminals, information relating to said interception notation with incoming calls to the exchange referring to said telephone number, and can insert said individual messages via said second terminals.

10. An arrangement according to claim 9, characterized in that said individual messages and said telephone numbers are stored in memory spaces in the interception equipment.

11. An arrangement according to claim 2, wherein said second means of said first terminals produce only said indication (a), and further comprising third terminals arranged to produce the audio and/or visual reproduction of the information in response to activation through said identification means.

12. An arrangement according to claim 2, characterized in that the central equipment includes a system for controlling passage of individuals through an area, and the first terminals are connected to said system.

13. An arrangement according to claim 3, characterized in that the central equipment includes a system for controlling passage of individuals through an area, and the first terminals are connected to said system.

14. An arrangement according to claim 11, characterized in that the central equipment includes a system for controlling passage of individuals through an area, and the first terminals are connected to said system.

15. An arrangement according to claim 2, characterized in that the central equipment includes interception equipment, and the first terminals are connected to said interception equipment.

16. An arrangement according to claim 3, characterized in that the central equipment includes interception equipment, and the first terminals are connected to said interception equipment.

17. An arrangement according to claim 11, characterized in that the central equipment includes interception equipment, and the first terminals are connected to said interception equipment.

18. An arrangement according to claim 2, characterized in that the central equipment includes interception equipment, at least one message distribution system, and at least one system connected to said message distribution system, said terminal systems being associated with at least one of the functions of passage control and banknote dispensing.

19. An arrangement according to claim 3, characterized in that the central equipment includes interception equipment, at least one message distribution systems, and at least one terminal system connected to said message distribution system, said terminal systems being associated with at least one of the functions of passage control and banknote dispensing.

20. An arrangement according to claim 11, characterized in that central equipment includes interception equipment, at least one message distribution system, and at least one terminal system connected to said message distribution system, said terminal system being associated with at least one of the functions of passage control and banknote dispensing.

21. An arrangement according to claim 7, wherein said first and third terminals are integrated with one another in a single terminal unit.

22. A data control and communication system, comprising:

a central control unit having a memory;

a plurality of first terminals connected to said central control unit, said first terminal units each having an activation means and being responsive to the entry into said activation means of a predetermined type of data relating to a person to communicate information about that person to said central control unit;

at least one second terminal having means for entering into said memory the identity of persons and individual messages associated with identified persons; and indicator means at said first terminals for indicating that a message for a person is stored in said memory, said central control unit being responsive to the entry of data associated with a person into the activation means of one of said first terminals to actuate the indicator means at said one terminal when a message for that person is stored in said memory.

* * * * *